Oct. 16, 1923.
F. H. HART
VEHICLE DOOR HANDLE
Filed Aug. 23, 1921
1,471,126
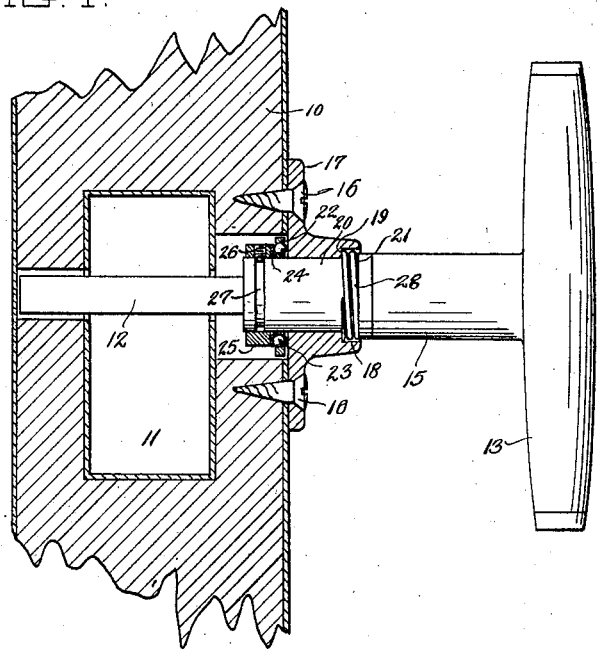
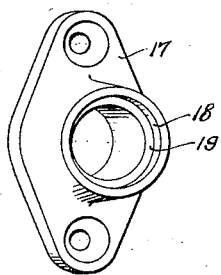
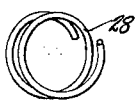
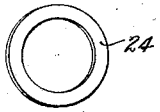
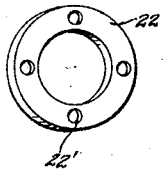
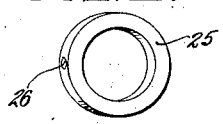
INVENTOR
Franklin H. Hart
BY
Wooster & Davis
ATTORNEYS Patented Oct. 16, 1923.

1,471,126

UNITED STATES PATENT OFFICE.

FRANKLIN H. HART, OF NEW HAVEN, CONNECTICUT, ASSIGNOR TO C. COWLES AND COMPANY, OF NEW HAVEN, CONNECTICUT, A CORPORATION OF CONNECTICUT.

VEHICLE-DOOR HANDLE.

Application filed August 23, 1921. Serial No. 494,449.

*To all whom it may concern:*

Be it known that I, FRANKLIN H. HART, a citizen of the United States, residing at New Haven, county of New Haven, State of Connecticut, have invented an Improvement in Vehicle Door Handles, of which the following is a specification.

This invention relates to vehicle door handles and has for an object to provide an improved means of mounting the handle and lock operating rod in the door to prevent rattling and also to insure easy and smooth operation thereof with no binding or sticking.

It is also an object of the invention to provide a device of this character which will be of simple and durable construction and neat in appearance.

Referring to the accompanying drawings,

Fig. 1 is a section through a portion of the vehicle door showing my improved handle applied thereto, the handle and lock operating rod being in elevation.

Fig. 2 is a perspective view of the escutcheon.

Fig. 3 is a perspective view of the resilient member.

Fig. 4 is a perspective of the bearing washer.

Fig. 5 is a perspective of the ball bearing cage, and

Fig. 6 is a perspective of the stop collar.

The door 10 is of the usual construction provided with a recess 11 for the lock mechanism, not shown, as it is of the usuel construction. The square lock operating stem or rod 12 extends through the door and lock in the usual manner and is connected to the outer handle 13, it being rigid with the stem 15 on the outer handle 13. Secured to the outer surface of the door is an escutcheon 16 providing a bearing for a portion of the stem 15 and provided with an annular recess 18 forming an annular shoulder 19. The portion of the stem 15 within the escutcheon indicated by 20 is reduced forming an annular shoulder 21 opposed to the shoulder 19 in the escutcheon. Mounted adjacent the inner walls of the escutcheon is a ball thrust bearing comprising a cage 22 in the shape of a flat ring having openings 22' in which the balls 23 are mounted in the usual manner by upsetting the walls around the openings, these balls bearing at one side against the inner wall of the escutcheon and on the opposite side against a thin flat bearing washer 24. The washer is held against the balls by means of a stop collar 25, secured on the stem of the handle by any suitable means, preferably a set screw 26 having its inner end seating within an annular groove 27 formed in the stem. Surrounding the reduced portion 20 of the stem and between the annular shoulders 19 and 21, is mounted a resilient member 28 preferably in the shape of a coiled spring, as shown.

With this construction and arrangement, the annular shoulder 21 and the collar 25 provide relatively fixed abutments spaced longitudinally of the stem between which the ball bearing, escutcheon and resilient member are mounted. The resilient member 28 reacts against the annular shoulders 19 and 21 to force the outer handle 13 and the rod 12 outwardly, and through the collar 25 press the balls of the ball bearing against the inner surface of the escutcheon. As this is a yielding mounting, the stem is at all times very free to turn, the ball bearing offering very little resistance and there is no binding action or sticking at certain times during the turning movement, as is often the case with ordinary straight bearings if they are not very carefully fitted. Also, as the ball bearing is always pressed against the escutcheon by a resilient member, there is no rattling of the stem within its mounting even after long continued use, as any wear is compensated for. Although I prefer to employ the washer 24 for a bearing for the balls on the inner side, this, obviously, may be omitted and the balls allowed to bear directly on the collar 25.

Having thus set forth the nature of my invention, what I claim is:

1. In a device of the class described a handle having a stem provided with two spaced relatively stationary shoulders; an escutcheon between said shoulders providing a bearing for said stem and adapted to be rigidly secured to a door, and a ball thrust bearing between the escutcheon and one of said shoulders comprising a ring having openings therethrough and balls in said openings projecting beyond the opposite faces of the ring, and a spring between the escutcheon and the other shoulder and arranged to press the first shoulder against said thrust bearing.

2. In a device of the class described a handle having a stem provided with two spaced relatively stationary shoulders, an escutcheon between said shoulders providing a bearing for said stem and adapted to be rigidly secured to a door, a ball thrust bearing between the escutcheon and one of said shoulders, and a resilient member between the escutcheon and the other shoulder and arranged to press the first shoulder against the thrust bearing.

3. In a device of the class described a handle having a stem provided with two spaced relatively stationary shoulders, an escutcheon between said shoulders providing a bearing for said stem and adapted to be rigidly secured to a door, a ball thrust bearing between the escutcheon and the inner shoulder, and a spring between the escutcheon and the other shoulder and arranged to press the inner shoulder against the thrust bearing.

4. In a device of the class described a handle having a stem provided with two spaced relatively stationary shoulders, an escutcheon between said shoulders providing a bearing for said stem and adapted to be rigidly secured to a door, said escutcheon coacting with the shoulders to position the handle and stem relative to and also provided with an annular recess in the outer wall thereof opposed to the outer shoulder on the stem, and a spring between these latter shoulders.

In testimony whereof I affix my signature.

FRANKLIN H. HART.